United States Patent
Fischer et al.

(10) Patent No.: US 8,438,026 B2
(45) Date of Patent: May 7, 2013

(54) METHOD AND SYSTEM FOR GENERATING TRAINING DATA FOR AN AUTOMATIC SPEECH RECOGNIZER

(75) Inventors: Alexander Fischer, Aachen (DE); Rolf Dieter Bippus, Lemiers (NL)

(73) Assignee: Nuance Communications, Inc., Burlington, MA (US)

( * ) Notice: Subject to any disclaimer, the term of this patent is extended or adjusted under 35 U.S.C. 154(b) by 1018 days.

(21) Appl. No.: 10/597,983

(22) PCT Filed: Feb. 10, 2005

(86) PCT No.: PCT/IB2005/050518
§ 371 (c)(1), (2), (4) Date: May 16, 2008

(87) PCT Pub. No.: WO2005/083677
PCT Pub. Date: Sep. 9, 2005

(65) Prior Publication Data
US 2008/0215322 A1    Sep. 4, 2008

(30) Foreign Application Priority Data
Feb. 18, 2004 (EP) .................................. 04100646

(51) Int. Cl.
*G10L 15/06* (2006.01)
(52) U.S. Cl.
USPC .......................... 704/243; 704/244; 704/245
(58) Field of Classification Search ........... 704/231–245
See application file for complete search history.

(56) References Cited

U.S. PATENT DOCUMENTS

| | | | |
|---|---|---|---|
| 5,455,888 A | 10/1995 | Iyengar et al. | |
| 5,581,652 A | 12/1996 | Abe et al. | |
| 6,199,041 B1 * | 3/2001 | Liu et al. | 704/231 |
| 6,381,571 B1 * | 4/2002 | Gong et al. | 704/233 |

(Continued)

FOREIGN PATENT DOCUMENTS

| | | |
|---|---|---|
| EP | 1239458 A2 | 9/2002 |
| JP | 6204952 A | 7/1994 |

(Continued)

OTHER PUBLICATIONS

Liao, Yuan-Fu et al: "Bandwidth Mismatch Compensation for Robust Speech Recognition"; Proceedings of Eurospeech 2003, Sep. 2003, p. 3093, XP007006837.

(Continued)

*Primary Examiner* — Douglas Godbold
(74) *Attorney, Agent, or Firm* — Wolf, Greenfield & Sacks, P.C.

(57) ABSTRACT

The invention describes a method and a system for generating training data ($D_T$) for an automatic speech recogniser (2) for operating at a particular first sampling frequency ($f_H$), comprising steps of deriving spectral characteristics ($S_L$) from audio data ($D_L$) sampled at a second frequency ($f_L$) lower than the first sampling frequency ($f_H$), extending the bandwidth of the spectral characteristics ($S_L$) by retrieving bandwidth extending information$_{OBE}$ from a codebook (6), and processing the bandwidth extended spectral characteristics ($S_{LE}$) to give the required training data ($D_T$). Moreover a method and a system (5) for generating a codebook (6) for extending the bandwidth of spectral characteristics ($S_L$) for audio data ($D_L$) sampled at a second sampling frequency ($f_L$) to spectral characteristics ($S_H$) for a first sampling frequency ($f_H$) higher than the second sampling frequency ($f_L$) are described.

9 Claims, 3 Drawing Sheets

U.S. PATENT DOCUMENTS

| | | | |
|---|---|---|---|
| 6,823,304 B2* | 11/2004 | Ikeda | 704/231 |
| 6,990,447 B2* | 1/2006 | Attias et al. | 704/240 |
| 7,065,487 B2* | 6/2006 | Miyazawa | 704/233 |
| 7,328,162 B2* | 2/2008 | Liljeryd et al. | 704/503 |
| 7,454,338 B2* | 11/2008 | Seltzer et al. | 704/243 |
| 2004/0125878 A1* | 7/2004 | Liljeryd et al. | 375/242 |
| 2005/0143989 A1* | 6/2005 | Jelinek | 704/226 |

FOREIGN PATENT DOCUMENTS

| | | |
|---|---|---|
| JP | 2002156992 A | 5/2002 |
| JP | 2002268698 A | 9/2002 |
| JP | 20022689698 A | 9/2002 |
| WO | WO0049601 A | 8/2000 |

OTHER PUBLICATIONS

Enbom N. et al: "Bandwidth Expansion of Speech Based on Vector Quantization of the Mel Frequency Cepstral Coefficients"; Speech Coding Proceedings, 1999 IEEE Workshop on Porvoo, Finland Jun. 20-23, 1999, Piscataway, NJ, USA, IEEE, US Jun. 20, 1999, pp. 171-173, XP010345574.

Yoshida et al, "Generation of Wideband Speech From Narrowband Speech by Codebook Mapping", Institute of Electronic Information, vol. J78-D-11, NOL 3, 1995, pp. 391-399.

Bauerecker et al, "On the Advantage of Frequency-Filtering Features for Speech Recognition With Variable Sampling Frequencies. Experiments With Speechdatcar Databases", Eurospeech 2003, Geneva, 4 Pages.

J. Epps et al., "A New Technique for Wideband Enhancement of Coded Narrowband Speech", Proceedings of the 1999 Workshop on Speech Coding, Finland, IEEE, Jun. 20, 1999, pp. 174-176.

Carl Holger et al., "Bandwidth Enhancement of Narrow-Band Speech Signals", Proceedings of the $7^{th}$ European Signal Processing Conference, UK, EURASIP, Sep. 13, 1994, vol. 2, pp. 1178-1181.

* cited by examiner (State of the Art)

METHOD AND SYSTEM FOR GENERATING TRAINING DATA FOR AN AUTOMATIC SPEECH RECOGNIZER

This invention relates in general to a method and system for generating training data for an automatic speech recognizer operating at a particular sampling frequency. Furthermore, the invention relates to a method for training an automatic speech recognition system, and a method and system for generating a codebook for use in the method for generating the training data.

Automatic speech recognizers are used for various applications such as control interfaces, automobile navigation systems, dialog systems etc., in which speech input is identified and interpreted. Generally, the user of such an automatic speech recognizer (ASR) speaks into a microphone, where the analog speech input is converted into digital form by the usual techniques of windowing and sampling the input analog signal, i.e. measuring the amplitude of the analog signal at a continuous rate to give a set of discrete samples. The rate at which the signal is sampled is called the sampling rate or sampling frequency. The resulting sequence of discrete samples gives a time-domain description of the analog signal. This time-domain description of the input signal is converted to a frequency domain description, for example by performing a Fast Fourier Transform on the sampled input signal, where various processing steps are performed to extract features, often in the form of feature vectors, for the input signal. By comparing these features to templates or other models, referred to in the following as "models", and locating a most suitable match, the ASR is able to analyze the speech input to determine what the user has said and which actions are to be carried out as a result.

The models used by an automatic speech recognizer are usually computed using training data, which are generally a collection of spoken utterances such as words, sentences or entire conversations. The training data are input to a front end, i.e. the first processing stages, of an automatic speech recognizer and processed to calculate the models for the automatic speech recognizer. To increase the success rate of the automatic speech recognizer in correctly identifying and understanding the input speech during operation, it is usual to employ a number of speakers for the training of the automatic speech recognizer with differing accents or intonations to give as broad a selection of utterances as possible. The more utterances available for training the of the automatic speech recognizer, the better its performance. Even better performance is attained if the training data are recorded under acoustic conditions similar to the conditions in which the automatic speech recognizer is intended to operate.

Every analog signal can be regarded as a composite of many component sinusoidal waves of different frequencies. The sampling frequency is chosen according to the desired quality of the samples. A high sampling rate ensures that higher-frequency components are included in the sampled signal. According to Nyquist, the sampling frequency must be at least twice the frequency of the highest desired frequency component, since any component frequency lower than half of the sampling rate is lost in sampling. Therefore, an automatic speech recognizer will benefit from a higher sampling rate for the input speech, due to additional information in the higher frequency bands which improves recognition of the speech. For example, an automatic speech recognizer operating in an automobile can perform considerably better at a higher sampling rate. To train a such an automatic speech recognizer operating at a higher sampling rate, it is necessary to first collect training audio data acquired at this sampling rate.

Training data for an automatic speech recognizer should cover as wide a variety of spoken utterances as possible, for example single words, whole sentences, or even entire conversations. Ideally, the spoken words originate from a number of speakers with different accents or quality of articulation. Therefore, to collect sufficient raw data to calculate the necessary number of models for robust performance of the automatic speech recognizer, it would require many persons recording large numbers of test words under realistic conditions to reflect the noisy environment of a typical automobile. With an appropriately diverse collection of utterances, the training data can ensure robust operation of the automatic speech recognizer, with reliable recognition of speech under actual working conditions. However, training audio data for automatic speech recognizers operating at higher sampling frequencies, e.g. for an automatic speech recognizer for use in automotive applications, are not readily available, since collecting data in adverse environments such as in a noisy automobile is very time-consuming and therefore prohibitively expensive. Furthermore, each type of automatic speech recognizer requires training data in the form of feature models in its own specific format. Training data in a format for a particular make of ASR may be quite unsuitable for a different type of ASR.

Therefore, an object of the present invention is to provide an easy and inexpensive method and system for generating training data for any automatic speech recognizer.

To this end, the present invention provides a method for generating training data for an automatic speech recognizer—constructed for a particular first sampling frequency—by deriving spectral characteristics from audio data sampled at a second frequency lower than the first sampling frequency, extending the bandwidth of the spectral characteristics by retrieving bandwidth extending information, and processing the bandwidth extended spectral characteristics to give the required training data.

The spectrum of a signal refers to the way energy in the signal is distributed over its various frequency components. Various characteristics of the spectrum can be used to describe the signal in the frequency domain. These characteristics are referred to in the following as "spectral characteristics" or "spectral representation", and may be calculated in a number of ways.

An inherent advantage of this method is that the training audio data used to generate the training data might be data that are already available for use in other, different applications, and might have been sampled at a lower frequency than required for the training data. Therefore, for example, databases of available telephone audio data might be implemented, since such databases are already available, are generally quite large, and cover a wide variety of spoken words and/or entire sentences from, typically, diverse sets of speakers. Since the bandwidth of 4 kHz generally suffices for telephony use, audio telephone data is usually sampled at 8 kHz. With the method according to this invention, this 8 kHz data may be used for the training of an automotive automatic speech recognizer which, for reasons of performance quality, might operate at a relatively higher frequency such as 11 kHz or even higher.

An appropriate system for generating training data for an automatic speech recognizer operating at a particular first sampling frequency comprises a converter for deriving spectral characteristics from audio data sampled at a second frequency lower than the first sampling frequency , a retrieval unit for retrieving bandwidth extending information for the spectral characteristics from a codebook, and a processing module for processing the bandwidth-extended spectral characteristics to give the required training data.

According to the present invention, the bandwidth of the spectral characteristics of the data available at the lower sampling frequency is extended so that the input appears to have been sampled at the higher frequency. The bandwidth extending information can be retrieved from a suitable source where it is stored, in an appropriate form. Here, such a source is commonly called a "codebook". A codebook is therefore a collection of templates or stochastic mixture models in a certain form, to which other data, in the same form, can be compared. The form of the data is generally quite complex, for example, the feature vectors for a typical ASR may be n-dimensional vectors, where n is often quite a large number, and comparison of the data to the templates usually involves locating the "best fit". This codebook, used to generate training data for an automatic speech recognizer, is not to be confused with a different type of codebook which may be used in later stages of the automatic speech recognizer, and which is of no relevance here.

The bandwidth extended spectral characteristics can then be processed in a next step to give the training data in a form required by further stages of the automatic speech recognizer.

To achieve this, a suitable codebook to allow for bandwidth extension is required. Therefore, it is a further object of the invention to provide a method and system for generating such a codebook.

According to the present invention, the generation of a codebook for use in the system described above—containing entries for extending the bandwidth of spectral characteristics for audio data sampled at a lower sampling frequency to spectral characteristics for a higher sampling frequency—comprises a number of steps for each entry of the codebook. In a first step, a first set of spectral characteristics is derived from audio data sampled at the first sampling frequency. A sampling rate transformation to the second sampling frequency is then performed on the audio data, and a corresponding second set of spectral characteristics is derived. Thus, the first and second set of spectral characteristics both describe the same audio samples but at different sampling frequencies. A codebook entry is computed for the second set of spectral characteristics and is augmented with additional higher frequency information from the first set of spectral characteristics. The entry is then stored in the codebook.

An appropriate device for generating a codebook for extending the bandwidth of a set of spectral characteristics for audio data sampled at a second sampling frequency to a set of spectral characteristics for a first sampling frequency higher than the second sampling frequency, comprises a converter for deriving a first set of spectral characteristics from audio data sampled at the first sampling frequency, a module for performing a sampling rate transformation on the audio data to the second sampling frequency and for deriving a corresponding second set of spectral characteristics for the second sampling frequency, and a codebook entry generator for generating an entry for the codebook based on a second set of spectral characteristics and for augmenting the codebook entry with additional higher frequency information from the corresponding first set of spectral characteristics.

The dependent claims and the subsequent description disclose particularly advantageous embodiments and features of the invention.

In both cases—generating training data for an ASR and generating a codebook—audio data are converted into sets of spectral characteristics by first performing a time/frequency-domain transformation on the audio data to give a set of frequency-domain coefficients. In the case where a step of downsampling from a higher sampling frequency to a lower sampling frequency is required, the downsampling might be performed directly on the already windowed and sampled input audio data, or it might be performed following the time-frequency domain transformation of the audio data. Alternatively, the downsampling effect might be achieved by filtering the audio data with an appropriate low-pass filter to crop the frequencies above.

The time/frequency domain transformation is preferably a Fast Fourier Transform (FFT), since this transformation allows the Discrete Fourier Transform of a sampled signal to be obtained rapidly and efficiently. The coefficients determined by the DFT, or FFT, represent the amplitudes of each of the frequency components of the audio signal and describe the spectrum of the audio signal. A different type of time/frequency domain transformation, e.g. a Discrete Cosine Transform (DCT), might equally be implemented as required.

The coefficients resulting from the time/frequency domain transformation can be used as the spectral characteristics. However, since their use implies more effort in generating the codebook, it is usual to perform further processing steps in order to save effort at a later stage. For example, the output of the time/frequency-domain transformation can be filtered with a filterbank to give a set of filterbank power values.

One advantage of such a filterbank is that the resulting spectral description requires considerably less data, and the frequency axis can be distorted, or warped, if desired.

It is common to perform a warping of the frequency axis after computing the frequency spectrum in order to imitate the performance of the human cochlea, since sound analysis in the cochlea takes place on a non-linear frequency scale, known as the Bark or mel scale. This scale is approximately linear up to about 1000 Hz and is approximately logarithmic thereafter. In a particularly preferred embodiment of the invention, the filters in the filterbank are configured to achieve the desired warping of the frequency axis.

The filterbank output power values might then be used as the spectral characteristics.

Spectral characteristics might also be obtained by calculating the logarithm of the filterbank power values in a further processing step to give a set of log-spectral coefficients. In the case where a warping of the frequency axis is effected in the filterbank according the mel scale, the resulting coefficients can be referred to as mel frequency coefficients. Such log-spectral coefficients are often the basis for generating feature vectors for use in systems such as automatic speech recognizers. The log-spectral coefficients might also be calculated using a different, equally suitable, technique.

In a particularly preferred embodiment of the invention, the log-spectral coefficients are used as the spectral characteristics for generating entries for the bandwidth extension codebook for use in a system for generating training data for an automatic speech recognizer. By performing a DCT on the log-spectral coefficients, these can be transformed into log-cepstral coefficients, which are particularly suited for application in the further processing steps of the automatic speech recognizer such as speech identification and understanding.

In an appropriate method for training an automatic speech recognizer, it is sufficient to generate the required training data using audio data sampled at a lower frequency and augmented with bandwidth extending information retrieved from a codebook, giving training data which appear to have been obtained at a higher sampling frequency. Nevertheless, the training data sampled at a lower frequency could be used along with training data sampled at the required frequency.

The codebook used in generating the training data from audio data sampled at the lower frequency is built by using a relatively small set of high-quality audio data sampled at the higher frequency. First and second sets of spectral characteristics are calculated for the audio data at the higher frequency, and the audio data downsampled to the lower frequency, respectively. Thus, the first and second sets of spectral characteristics both describe effectively the same input audio data samples. However, the first set contains additional high frequency information not present in the second set. The codebook entry calculated for the second set of spectral characteristics can therefore be augmented using the corresponding first set of spectral characteristics.

In one embodiment of the invention, each codebook entry might comprise the information from both first and second sets of spectral characteristics, preferably stored in such a way that both sets are associated with each other and yet remain separate.

In an alternative embodiment, each codebook entry might comprise the information from the second set of spectral characteristics, together with the additional bandwidth extending information extracted from the first set of spectral characteristics.

Depending on the quality of the audio data at the higher frequency used to build the codebook, it might be necessary to modify the spectrum of the audio data by removing certain unwanted spectral components such as background noise. To this end, the average or mean spectrum might be continuously calculated for the second set of spectral characteristics. The mean spectrum can then be subtracted or removed from the spectral characteristics of the audio data before computing the codebook entries. In this way, relatively "clean", data is used for building the codebook.

Similarly, the audio data sampled at the lower frequency and used to generate training data for the automatic speech recognizer may also require spectral modification to remove unwanted noise or channel effects. Such spectral features present in the audio data might have a negative effect when incorporated into the training data, and are preferably removed by continuously calculating the average or mean spectrum from the audio data and subtracting the mean spectrum from the spectral characteristics of the audio data before retrieving the bandwidth extending information from the codebook. This ensures that the training data generated for the automatic speech recognizer is essentially free of unwanted noise or channel effects.

Since the training data for the automatic speech recognizer should realistically reflect the typical audio qualities of the environment in which it is intended to operate, it may be desirable to add in or insert suitable background noise information, or other similar spectral features. To this end, the spectrum of the bandwidth extended spectral characteristics might be adjusted to alter its spectral properties in an optional processing step. For reasons of computational ease, such a processing step is preferably carried out in the linear domain. This might necessitate a step of calculating the inverse log of the spectral characteristics, should these be in logarithmic form. The spectrum of the audio data can then be modified by adding in the required features. The logarithm of the spectrum is then calculated again, as necessary, to return the spectrum to the log domain.

Other objects and features of the present invention will become apparent from the following detailed descriptions considered in conjunction with the accompanying drawings. It is to be understood, however, that the drawings are designed solely for the purposes of illustration and not as a definition of the limits of the invention.

Figure 1:
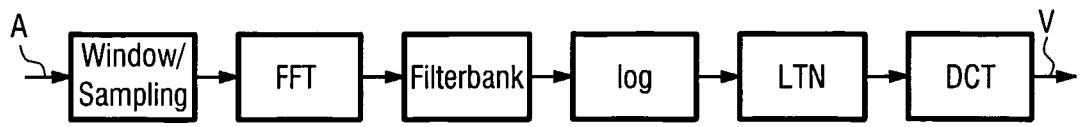
FIG. 1 is a block diagram showing usual processing steps in a front end of an automatic speech recognizer.

In FIG. 1, a simplified representation shows the stages in a typical front end of an automatic speech recognizer involved in processing an input analog audio signal A to generate feature vectors V for the audio signal for use at a later stage in speech recognition. The analog audio signal A, which may comprise both speech and noise components, is first windowed and sampled at a sampling frequency f to give sets of digital audio samples. A Fast Fourier Transform (FFT) is performed for each set of digital samples, giving a corresponding set of Fourier coefficients. These in turn are forwarded to a filterbank in which the filters are configured in a non-linear manner according to the Bark or mel scale, to calculate the energies of the signal's various frequency components, giving a set of filterbank energy values. The logarithm is calculated for the filterbank energy values in a log unit to give a set of log filterbank coefficients. A Long Term Normalisation (LTN) is performed on the log filterbank coefficients in order to normalise channel effects. The LTN output is then further processed by performing a Discrete Cosine Transform (DCT) on the log spectrum coefficients to give feature vectors V, in this case cepstral coefficients. In further stages of the automatic speech recognizer, not shown in this diagram, the feature vectors V are used for speech recognition and speech understanding.

Figure 2:
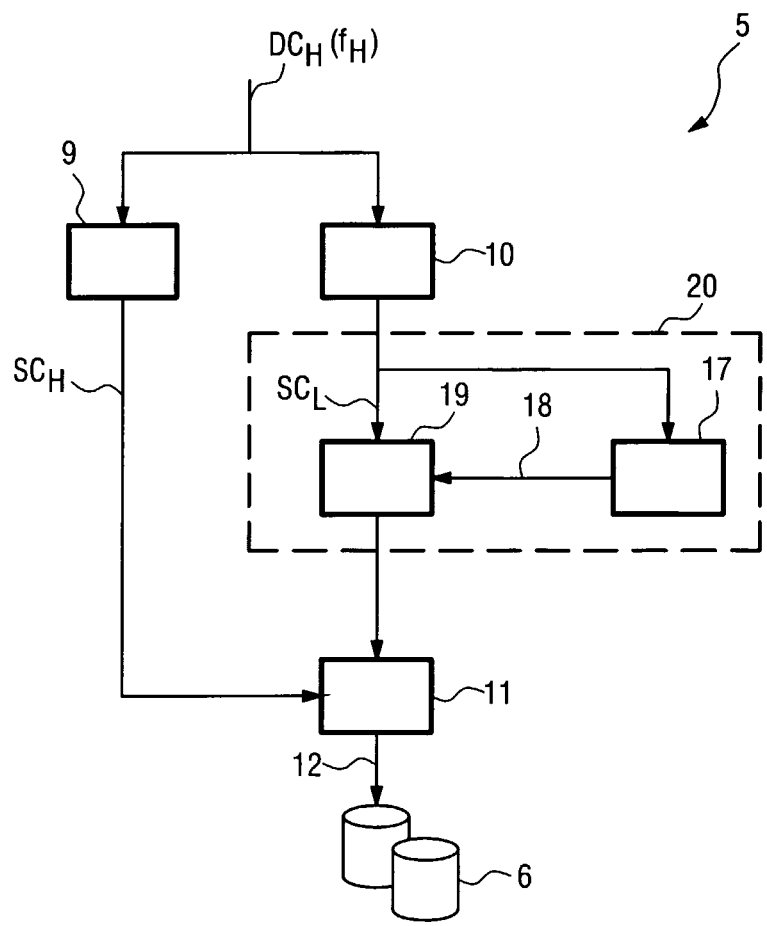
FIG. 2 is a block diagram of a system for generating a codebook according to an embodiment of the invention.
Figure 3:
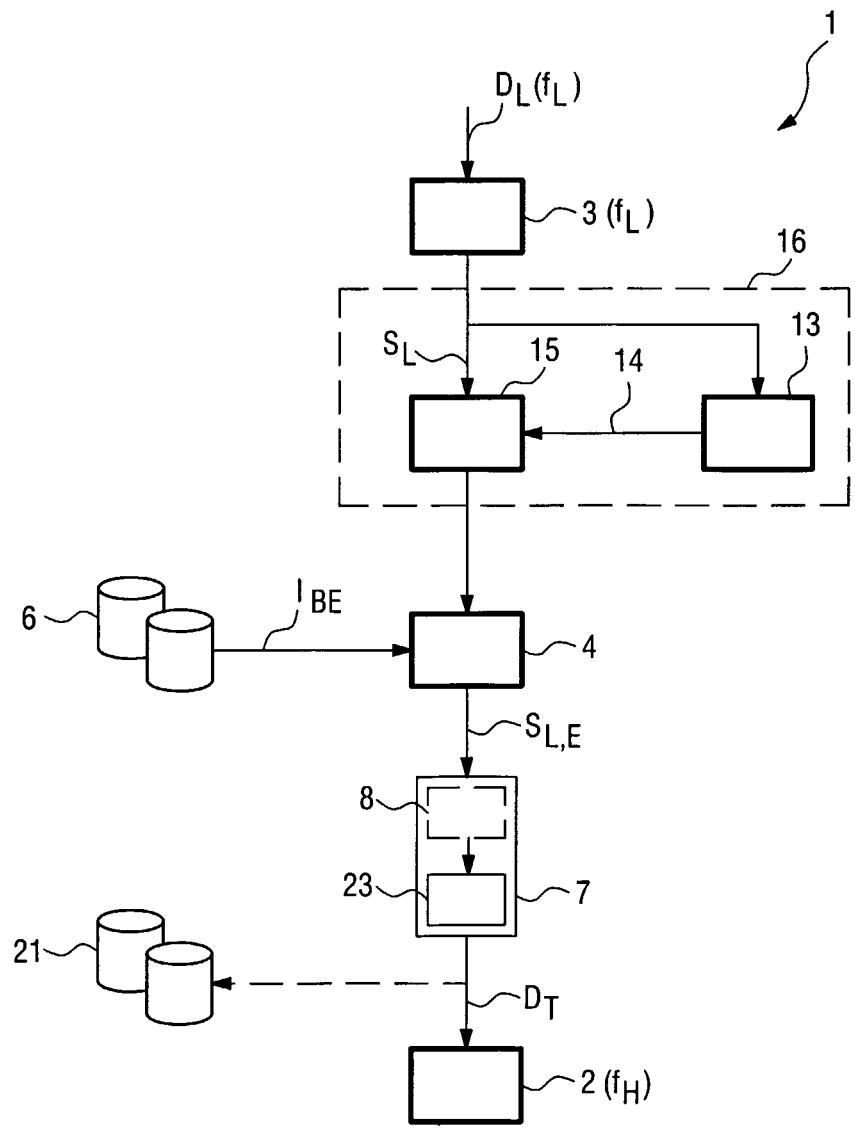
FIG. 3 is a block diagram of a system for generating training data for an automatic speech recognizer according to an embodiment of the invention.

FIG. 2 shows a system for generating a codebook 6 for use in a system according to FIG. 3 for generating training data for an automatic speech recognizer 2 built for a sampling frequency $f_H$, and which is to be trained using data sampled at a lower frequency $f_L$. Audio data $DC_H$, which has already been sampled at the higher frequency $f_H$, are processed by a module 9, similar in parts to the front end of an automatic speech recognizer as described in FIG. 1. At the same time, the audio data are processed by a similar module 10. Modules 9 and 10 can be seen in detail in FIGS. 4 and 5 respectively.

Figure 4:
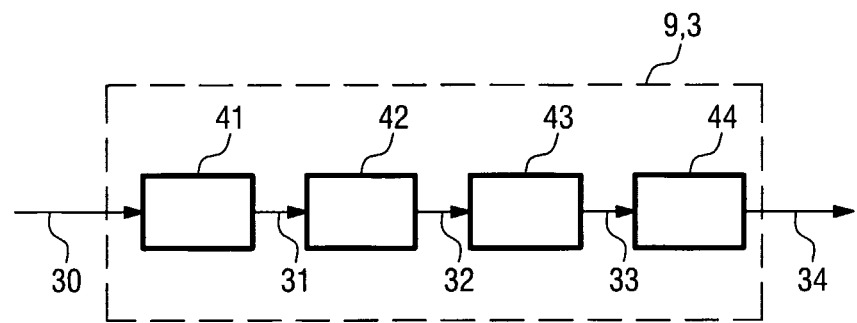
FIG. 4 is a block diagram showing processing steps in a module for deriving spectral characteristics for a system described by FIGS. 2 and 3.

FIG. 4 shows the module 9 built for the extraction of spectral characteristics 34 from input audio data 30, which has been obtained by windowing and sampling an analog signal at the required sampling frequency f. The samples 30 are processed in a block 41 to calculate the FFT coefficients 31, and then filtered in a filterbank unit 42 to give filterbank power values 32, for which logarithm spectral values 33 are calculated in a log block 43. Long Term Normalisation is performed on the log spectral values 33 in a block 44 to give a set of spectral characteristics 34.

Figure 5:
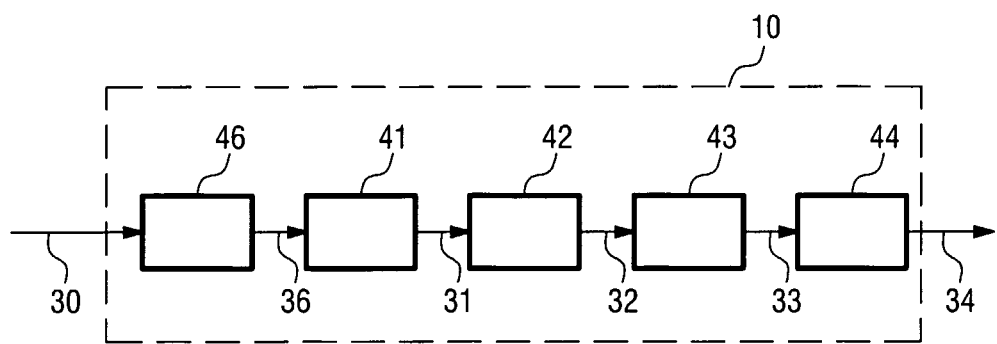
FIG. 5 is a block diagram showing processing steps in a module for deriving spectral characteristics for a system described by FIG. 2.

The sequence of processing steps in FIG. 5 is essentially the same as in FIG. 4, but with an additional step of downsampling the input audio data 30 in a downsampling block 46 to give samples at a lower sampling frequency $f_L$. The spectral characteristics calculated for the audio data $DC_H$ and output from blocks 9 and 10, i.e. $SC_H$ and $SC_L$ respectively, have been calculated using the same input samples, but $SC_H$ contains higher frequency information not present in $SC_L$.

In an optional unit 20, channel or additive noise characteristics can be normalised in case they differ by a non-negligible amount from those of the audio data $D_L$ (FIG. 3) used to generate the bandwidth extended data. This unit 20 can comprise any suitable means for channel normalization or additive noise compensation. In FIG. 2 as an example the log mean spectrum 18 is calculated for the log spectral characteristics $SC_L$ in a mean spectrum calculation block 17 and is subtracted from the log spectral characteristics $SC_L$ in a mean subtraction block 19. Both blocks 10 and 20 can be merged as appropriate to avoid duplication of processing steps, e.g. in case the additional noise/channel compensation requires processing in the linear spectral domain (before calculating the logarithm). This optional unit 20 can be omitted if the low frequency part of the channel and noise characteristics of audio data $DC_H$ as exhibited in its spectral representation $SC_L$ are sufficiently close to those of the audio Data $D_L$.

Otherwise, unit 20 is used to remove or normalise channel and noise effects present in the audio data $DC_H$.

In a codebook entry generation unit 11, codebook entries 12 for the codebook 6 are computed for sets of spectral characteristics $SC_L$. These entries 12 are augmented or extended by using higher frequency components present in the corresponding sets of spectral characteristics $SC_H$, and stored in the codebook 6. Thus, a codebook 6 is assembled comprising entries for audio data sampled at $f_L$, using audio data which has actually been sampled at a higher frequency $f_H$, and containing some or all of the higher frequency information which would otherwise be lost in downsampling.

How this codebook could be used to generate training data for an automatic speech recognizer $2(f_H)$ which is built to operate on a sampling frequency $f_H$ can be seen in FIG. 3. The input audio data $D_L$ for training the automatic speech recognizer $2(f_H)$ is available at a lower frequency $f_L$. The input audio data $D_L$ are first processed in a module 3 similar in parts to the front end of an automatic speech recognizer as already described in FIG. 1 to give sets of spectral characteristics $S_L$. The module 3 is constructed in a manner identical to module 9, used to process the audio data in the codebook generation process described in FIG. 2. This shows that the audio data at higher sampling frequency are processed in the same manner in both cases.

The optional unit 16 represents the counterpart to unit 20 in FIG. 2. This unit 16 can also comprise any suitable means for channel normalization or additive noise compensation corresponding to unit 20. Therefore, in this example the log mean spectrum 14 is calculated for the log spectral characteristics $S_L$ in a mean spectrum calculation block 13 and is subtracted from the log spectral characteristics $S_L$ in a mean subtraction block 15. This optional unit 16 can be omitted if the channel and noise characteristics of the audio data $D_L$ are sufficiently similar to those of audio data $DC_H$ used to train the codebook 6. Otherwise, unit 16 of the ASR training data generation system 1 and unit 20 of the codebook generation system 5 of FIG. 2 are used to normalise channel and noise characteristics of the audio data $D_L$ and $DC_H$ respectively. The reason for such a step is to ensure that the process of codebook lookup is not adversely affected by a mismatch in channel and/or background noise between training and usage of the codebook.

The bandwidth of each set of spectral characteristics $S_L$ is now extended to include higher frequency components by retrieving bandwidth extending information $I_{BE}$ from the codebook 6. This bandwidth extending information $I_{BE}$ can be taken from the entry or template in the codebook 6 which most closely matches the set of spectral characteristics $S_L$ or is calculated from all entries via weighted interpolation (see below).

The process of matching spectral characteristics to templates in a codebook depends to a large extent on the manner in which the codebook is constructed.

In its most general version, a "stochastic mixture model" is used in a codebook for modelling the probability distribution of spectral characteristics obtained from input data sampled at a particular sampling frequency. A mixture model is the weighted sum of unimodal probability density functions. The most well-known and easiest to handle unimodal function is the Gaussian distribution. The summation weights represent the a priori probabilities for each respective unimodal distribution (mode) of the mixture distribution. For the purpose of bandwidth extension, each mode of the mixture model has an associated output vector. For each input vector, a probabilty density value can be calculated for each mode of the mixture from which probabilities for each mode can be derived. The output vector (bandwidth extended version of the input or additional part from the higher bands) is calculated by weighted summation of the output vectors attached to each mode where the calculated probabilities serve as weights (weighted interpolation).

Other types of codebook and template matching methods ("codebook lookups") can be regarded as special cases or approximations of the Mixture Model described above, such as for example:

1. Gaussian Mixture Model, using Gaussian distributions for each mode;
2. use of Gaussians with the identity matrix as covariance matrix. These are represented by their means only. Probability density calculation amounts to calculating the "distance" between input vector and mean;
3. approximation of the probabilities calculated for each input vector by setting it to 1.0 for the mode with highest probability (the "closest" mode) and 0.0 for all others.

Here, the output vector corresponds to the bandwidth extending information $I_{BE}$ which is used to replace or extend the spectral characteristics $S_L$ to give a set of spectral characteristics $S_{L,E}$, which appear to have been obtained by sampling at the higher frequency $f_H$.

In a final processing module 7 an Discrete Cosine Transform is performed in block 23 on the log spectrum to give the feature vectors or training data $D_T$ required by the automatic speech processor 2. The training data $D_T$ can be forwarded directly to the next stages of the automatic speech processor 2, or can be stored for later use in a database 21.

In order to reflect the environment in which the automatic speech recognizer 2 will operate, the spectral characteristics $S_{L,E}$ can be modified accordingly in an optional block 8. This optional block 8 is shown here as part of the final processing module 7, placed before the DCT. For example, noise can be added to the spectrum to reflect the noisy environment in an automobile. Since this type of operation should be performed in the linear spectral domain, the inverse log is first calculated for the spectral characteristics $S_{L,E}$ before adding the noise spectrum and calculating the logarithm for the spectral characteristics $S_{L,E}$ once again.

Although the present invention has been disclosed in the form of preferred embodiments and variations thereon, it will be understood that numerous additional modifications and variations could be made thereto without departing from the scope of the invention. The spectral characteristics used to describe properties of the input audio may be taken to be the FFT coefficients, the filterbank power values, log spectral coefficients or any other appropriate spectral description (such as wavelets etc.). The point at which bandwidth extension is to be performed may be chosen to best suit the realisation. Equally, the sequence in which the LTN, DCT or other processing stages are placed relative to the other stages may be chosen to suit requirements of the realisation.

For the sake of clarity, it is also to be understood that the use of "a" or "an" throughout this application does not exclude a plurality, and "comprising" does not exclude other steps or elements. A "unit" or "module" may comprise a number of blocks or devices, unless explicitly described as a single entity. The units, modules, blocks and devices described may be realised by a person skilled in the art in the form of hardware and/or by implementing software modules. The terms "spectrum" and "spectral" might also mean "cepstrum" and "cepstral", which refer to the FFT or DCT transform of the log spectrum after warping according to the Bark or mel scale.

The invention claimed is:

1. A method for generating training data for an automatic speech recognizer operating at a first sampling frequency, comprising:
    deriving spectral characteristics from audio data sampled at a second frequency lower than the first sampling frequency;
    extending a bandwidth of the spectral characteristics by retrieving bandwidth extending information from a codebook so that the audio data sampled at the second frequency is compatible with the automatic speech recognizer operating at the first sampling frequency; and
    processing the bandwidth extended spectral characteristics to give the required training data,
    wherein extending the bandwidth includes augmenting the spectral characteristics of the audio data sampled at the second frequency with a set of spectral characteristics of audio data sampled at the first sampling frequency obtained from the codebook, wherein each entry in the codebook is generated by:
    deriving a first set of spectral characteristics from audio data sampled at the first sampling frequency;
    performing a sampling rate transformation on the audio data to the second frequency and deriving a corresponding second set of spectral characteristics; and
    generating a codebook entry comprising information from the second set of spectral characteristics, together with additional bandwidth extending information extracted from the first set of spectral characteristics.

2. A method according to claim 1, where the conversion of audio data into sets of spectral characteristics comprises calculating the FFT of the audio data to give a set of Fourier coefficients and filtering the output of the FFT with a filterbank to give a set of filterbank power values.

3. A method according to claim 2, where the conversion of audio data into sets of spectral characteristics comprises processing the FFT coefficients or the filterbank power values to give a set of log-spectral coefficients.

4. A method according to claim 1, where the processing of bandwidth extended spectral characteristics comprises a step of altering the spectrum to adjust signal properties of the audio data.

5. A method according to claim 4, where the step of altering the spectrum to adjust the signal properties of the audio data is performed in the linear domain.

6. A method according to claim 1, where the derivation of the spectral characteristics from audio data is followed by a step subtracting the mean spectrum from the spectral characteristics.

7. A method for training an automatic speech recognition system wherein the data used for training are at least partially generated using a method according to claim 1.

8. A system for generating training data for an automatic speech processor operating at a first sampling frequency, comprising:
    a hardware converter for deriving spectral characteristics from audio data sampled at a second frequency lower than the first sampling frequency;
    a hardware retrieval unit for retrieving bandwidth extending information for the spectral characteristics from a codebook so that the audio data sampled at the second frequency is compatible with the automatic speech processor operating at the first sampling frequency; and
    a hardware processing module for processing the bandwidth-extended spectral characteristics to give the required training data,
    wherein the hardware retrieval unit augments the spectral characteristics of the audio data sampled at the second frequency with the set of spectral characteristics of audio data sampled at the first sampling frequency obtained from the codebook, wherein each entry in the codebook is generated by:
    deriving a first set of spectral characteristics from audio data sampled at the first sampling frequency;
    performing a sampling rate transformation on the audio data to the second frequency and deriving a corresponding second set of spectral characteristics; and
    generating a codebook entry comprising information from the second set of spectral characteristics, together with additional bandwidth extending information extracted from the first set of spectral characteristics.

9. A method for generating training data for an automatic speech recognizer operating at a first sampling frequency, comprising:
    deriving spectral characteristics from audio data sampled at a second frequency lower than the first sampling frequency;
    extending a bandwidth of the spectral characteristics by retrieving bandwidth extending information from a codebook so that the audio data sampled at the second frequency is compatible with the automatic speech recognizer operating at the first sampling frequency; and
    processing the bandwidth extended spectral characteristics to give the required training data,
    wherein extending the bandwidth includes augmenting the spectral characteristics of the audio data sampled at the second frequency with a set of spectral characteristics of audio data sampled at the first sampling frequency obtained from the codebook, wherein each entry in the codebook is generated by:
    deriving a first set of spectral characteristics from audio data sampled at the first sampling frequency;
    performing a sampling rate transformation on the audio data to the second frequency and deriving a corresponding second set of spectral characteristics; and
    generating a codebook entry comprising information from the first and second sets of spectral characteristics, stored such that the first and second sets of spectral characteristics are associated with each other and yet remain separate.

* * * * *